(12) United States Patent
Beyer et al.

(10) Patent No.: US 7,991,771 B2
(45) Date of Patent: Aug. 2, 2011

(54) ADAPTIVE EVALUATION OF TEXT SEARCH QUERIES WITH BLACKBOX SCORING FUNCTIONS

(75) Inventors: Kevin Scott Beyer, San Jose, CA (US); Robert W. Lyle, Morgan Hill, CA (US); Sridhar Rajagopalan, Oakland, CA (US); Eugene J. Shekita, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 871 days.

(21) Appl. No.: 11/561,949

(22) Filed: Nov. 21, 2006

(65) Prior Publication Data

US 2007/0150467 A1 Jun. 28, 2007

Related U.S. Application Data

(62) Division of application No. 10/740,702, filed on Dec. 19, 2003, now abandoned.

(60) Provisional application No. 60/474,877, filed on May 30, 2003.

(51) Int. Cl.
*G06F 17/30* (2006.01)
(52) U.S. Cl. ...................................... 707/728
(58) Field of Classification Search .................. 707/728
See application file for complete search history.

(56) References Cited

U.S. PATENT DOCUMENTS

| 6,144,958 | A | 11/2000 | Ortega et al. | 707/5 |
| 6,243,713 | B1 * | 6/2001 | Nelson et al. | 707/104.1 |
| 6,353,825 | B1 | 3/2002 | Ponte | 707/5 |
| 6,785,671 | B1 | 8/2004 | Bailey et al. | 707/3 |
| 6,915,308 | B1 * | 7/2005 | Evans et al. | 707/104.1 |
| 2003/0028520 | A1 * | 2/2003 | Alpha | 707/2 |
| 2004/0172374 | A1 * | 9/2004 | Forman | 706/12 |
| 2005/0004889 | A1 | 1/2005 | Bailey et al. | 707/1 |

OTHER PUBLICATIONS

"The Anatomy of a Large-Scale Hypertextual Web Search Engine", S. Brim et al., Proceedings of the 7th International World Wide Web Conference (WWW7), 1998.
"Searching with Numbers", R. Agrawal et al., Proceedings of the 2002 International World Wide Web Conference (WWW2002), Honolulu, Hawaii, May 2002.
"Full text indexing based on lexical relations: An application: Software libraries", Y. Maarek, et al., Proceedings of the Twelfth International ACM SIGIR Conference on Research and Development in Information Retrieval, Cambridge, MA, Jun. 1989, pp. 198-206.
"Okapi at TREC-3", S. E. Robertson, et al., Proceedings of the Third Text Retrieval Conference (TREC-3), National Institute of Standards and Technology, NIST, 1994, pp. 109-126.

(Continued)

*Primary Examiner* — James Trujillo
*Assistant Examiner* — Amresh Singh
(74) *Attorney, Agent, or Firm* — Harrington & Smith (57) ABSTRACT

Disclosed is an evaluation technique for text search with black-box scoring functions, where it is unnecessary for the evaluation engine to maintain details of the scoring function. Included is a description of a system for dealing with black-box searching, proofs of correctness, as well experimental evidence showing that the performance of the technique is comparable in efficiency to those techniques used in custom-built engines.

25 Claims, 6 Drawing Sheets

OTHER PUBLICATIONS

"Overview of the Tenth Text Retrieval Conference (TREC-10)", E. M. Voorhees, et al., Proceedings of the Tenth Text Retrieval Conference (TREC-1 0), National Institute of Standards and Technology, 2001.

"Query evaluation: Strategies and optimizations", H. Turtle, et al., Information Processing and Management, 31(6): 831-850, 1995.

"Building a Distributed Full-Text Index for the Web", Sergey Melnik, et al., ACM Transactions on Information Systems, 19(3):217-241, Jul. 2001.

"Database System Implementation":, H. Garcia-Molina, et al., Prentice-Hall, 2000, pp. 40-49, 299-307.

"Static index pruning for information retrieval systems", David Carmel et al., Proceedings of the $24^{th}$ Annual International ACM SIGIR Conference on Research and Development in Information Retrieval, Sep. 2001, pp. 41-50.

"Comparing Top k Lists", R. Fagin et al., 2003 Society for industrial and Applied Mathematics, vol. 17, No. 1., pp. 134-160.

* cited by examiner

Fig. 1

PRIOR ART

ADAPTIVE EVALUATION OF TEXT SEARCH QUERIES WITH BLACKBOX SCORING FUNCTIONS

CROSS REFERENCE TO RELATED APPLICATIONS

This application is a divisional patent application of U.S. patent application Ser. No. 10/740,702, filed Dec. 19, 2003 now abandoned which claimed priority under 35 U.S.C. §119 (e) to co-pending U.S. Provisional patent application 60/474, 877 filed on May 30, 2003. U.S. patent application Ser. No. 10/740,702 is now abandoned.

TECHNICAL FIELD OF THE INVENTION

This invention relates generally to methods, apparatus and computer programs for execution of text search queries over a large body of data.

BACKGROUND OF THE INVENTION

Searching a body of documents for specific information is increasingly important, in an increasing number of systems. This introduction examines searching and ranking techniques for responding to a specific search request. Typically, providing best available information calls for scoring information in each document and then by ranking the information or the documents according to relevance. A variety of techniques are used to complete such tasks.

Custom built solutions typically offer acceptable performance for searching large bodies of data. Examples include those available for searching the Internet. Some of the commercially available solutions include biases that either speed the search or qualify data.

Experience has shown that it is typically a substantial challenge to meet performance expectations within the confines of certain systems. Examples of systems where challenges arise include general purpose database management systems and content management systems. For developers of searching algorithms, challenges to meeting expectations in such systems include balancing the concepts of ranking and approximation, as well as providing for a generality of purpose. These, and other concepts, are discussed in more detail to provide some perspective.

Ranking and approximation specify what to return when there are too many or too few results. One may consider these concepts to be at different ends of a single continuum. In order to provide desired searching capabilities, it is considered preferable that typical database systems should incorporate ranking into the generic and extensible architecture of the database engine. Typical database systems do not integrate the concepts of ranking and approximation. New and different ranking criteria and ranking functions should be easily incorporated into a query processing runtime. Preferably, database systems should not use a biased ranking method.

For more perspective, consider the following aspects of ranking text in databases. Note that information retrieval (IR) literature contains many ranking heuristics. A few of these heuristics, to which later reference will be made, include the Term Frequency Inverted Document Frequency (TFIDF) function, Static Rank functions, Searching by Numbers, Lexical Affinities (LA) and Salience Levels (SL), as well as other functions.

One common method for ranking text is by use of the TFIDF score. This is calculated as:

$$TFIDF(q, d) = \sum_{t \in q} \frac{\varphi_{t,d}}{\Gamma_t}$$

Here, q represents the query, $\varphi_{t,d}$ is the number of times term t occurs in document d, divided by the total number of terms in the document d. $\Gamma_t$ is the number of documents which contain term t. A discussion of TFDIF is provided in the reference "Managing Gigabytes," I. H. Witten, A. Moffat, and T. C. Bell. Morgan Kaufman, San Francisco, 1999.

One example of a search engine that uses the Static Rank is the GOOGLE search engine, which uses PageRank. Typically, Static Ranks are used in combination with query dependent ranks such as TFIDF. As an example, scoring where the combination is used can be accomplished using a metric such as:

$$COMBIN(q, d) = \alpha STATIC(d) + TFIDF(q, d)$$

The combination presumes that some documents are generally better than others, and therefore, should be favored during retrieval. A discussion of Static Ranks is presented in the publication by S. Brim and L. Page, and entitled "The Anatomy of a Large-Scale Hypertextual Web Search Engine," as published in Proceedings of the 7th International World Wide Web Conference (WWW7), 1998. This publication also discusses PageRank.

As an example of keyword based querying of structured datasets, consider the following example of Searching by Numbers. In the example, a user enters a few numbers into a search bar, for instance, "1 GHz, 256M" and the search system translates the query automatically to something like:

(processorSpeed≈1 GHz)

.and. (memoryCapacity≈256MB)

In addition to automated translation to a structured form, results are ranked based on a discrepancy between the requested value and actual value returned for the two parameters of interest. A discussion of Searching by Numbers is presented in the publication by R. Agrawal and R. Srikant, entitled "Searching with Numbers," published in the Proceedings of the 2002 International World Wide Web Conference (WWW2002), Honolulu, Hi., May 2002.

Lexical Affinities and Salience Levels are described as score boosting heuristics. In the case of Lexical Affinities (LA), a score is boosted when two terms in the query appear within a small window of each other. In the case of Salience Levels (SL), the score is boosted when a query term appears with increased prominence such as in the title, a paragraph heading, or with bold and/or italicized text. Score boosting methods such as the use of LA and SL are commonly used in modern information retrieval systems. A discussion of Lexical Affinities and Salience Levels is provided in the publication by Y. Maarek and F. Smadja, and entitled "Full text indexing based on lexical relations: An application: Software libraries," appearing in the Proceedings of the Twelfth International ACM SIGIR Conference on Research and Development in Information Retrieval, pages 198-206, Cambridge, Mass., June 1989. Further examples are provided in the publication by E. M. Voorhees and D. K. Harman, and entitled "Overview of the Tenth Text Retrieval Conference (TREC-10)," appearing in the Proceedings of the Tenth Text Retrieval Conference (TREC-10), National Institute of Standards and Technology, 2001.

Another popular scoring function, referred to as OKAPI, is discussed in the publication by S. E. Robertson, S. Walker, S. Jones, M. M. Hancock-Beaulieu, and M. Gatford, entitled "Okapi at TREC-3," appearing in Proceedings of the Third Text REtrieval Conference (TREC-3), pages 109-126. National Institute of Standards and Technology. NIST, 1994.

Presently, there is a debate by those skilled in the art over the choice of "term at a time" (TAAT) search strategies versus "document at a time" (DAAT) search strategies. One example of the various perspectives on these strategies is provided in the publication by H. Turtle and J. Flood, entitled "Query evaluation: Strategies and optimizations," appearing in Information Processing and Management, 31(6):831-850, 1995.

Typically, a TAAT search engine maintains a sparse vector spanning the documents. The TAAT search engine iterates through the query terms and updates the vector with each iteration. The final state of the vector becomes the score for each document. TAAT search engines are relatively easy to program and new ranking functions are easily included in TAAT runtimes. Conversely, a DAAT search engines make use of document indices. Typically, a DAAT runtime search engine iterates through documents subject to the search and scores a document before proceeding to the next one. A heap maintains the current top l documents identified.

In the context of large data sets, it is considered by some that the index based DAAT runtime search engine outperforms the vector based TAAT search engine during query execution. However, DAAT runtimes are hard to implement. For example, each DAAT ranking engine is typically built as a custom system, rather than being implemented on top of a general purpose platform such as a database system. Typically, this is due to the fact that commercial database indices have little or no support for the ranking heuristics used in the text.

To address this issue, DAAT engines have typically been built using a two layer architecture. The user's query would first be translated into a Boolean query. A lower stage performs retrieval based on the Boolean query (or near Boolean query, that is a Boolean query with a "near" operator) which is then passed to a ranking stage for a complete evaluation. Thus, the Boolean stage acts as a filter which eliminates documents which have little or no relevance to the query or are otherwise unlikely to be in the result set.

From a runtime optimization perspective, two layer DAAT architecture has two potential problems. First, there is the need for a middle layer which translates a query into the Boolean form. This can be a complicated process. For example, translating to a Boolean "AND" of all the query terms may not return a potential hit, while translating to a Boolean "OR" may be an ineffective filter. Thus, depending on how effective the Boolean filters are, the DAAT search may end up performing a significant amount of extra input and output operations. Second, effective translations can lead to complicated intermediate Boolean queries. Consequently, the filters associated with even simple scoring functions such as TFIDF or COMBIN can present daunting optimization problems.

For further reference, the merge operator and the zig-zag join operators are described in the publication by Sergey Melnik, Sriram Raghavan, Beverly Yang, and Hector Garcia-Molina, entitled "Building a Distributed Full-Text Index for the Web," appearing in ACM Transactions on Information Systems, 19(3):217-241, July 2001; and the publication by H. Garcia-Molina, J. Ullman, and J. Widom, entitled "Database System Implementation," Prentice-Hall, 2000.

From a functional perspective, a scoring function uses more information than the Boolean filters. For instance, a TFIDF requires determination of the quantity $\phi_{t,d}$, which requires more resources than determining if a term is present in a document. Per document scores (such as STATIC) and per term statistics (such as $\Gamma_t$) are used in scoring. Scoring in Searching by Numbers requires use of the numerical values in addition to indices. Heuristics such as LA and SL require information about where in the document and in what context any term occurred. In short, a typical information retrieval engine may use many heuristics and combine them in complicated ways. Examples are provided in two further publications. Consider the publication by David Carmel, Doron Cohen, Ronald Fagin, Eitan Farchi, Michael Herscovici, Yoelle S. Maarek, and Aya Soffer, entitled "Static index pruning for information retrieval systems," appearing in the Proceedings of the 24th Annual International ACM SIGIR Conference on Research and Development in Information Retrieval, pages 41-50, New Orleans, La., September 2001. Such schemes often require data to be provided to support the ranking decisions.

In a typical modem day search engine, the scoring function and the runtime engine are co-designed. This prior art arrangement is depicted in FIG. 1.

Figure 1:
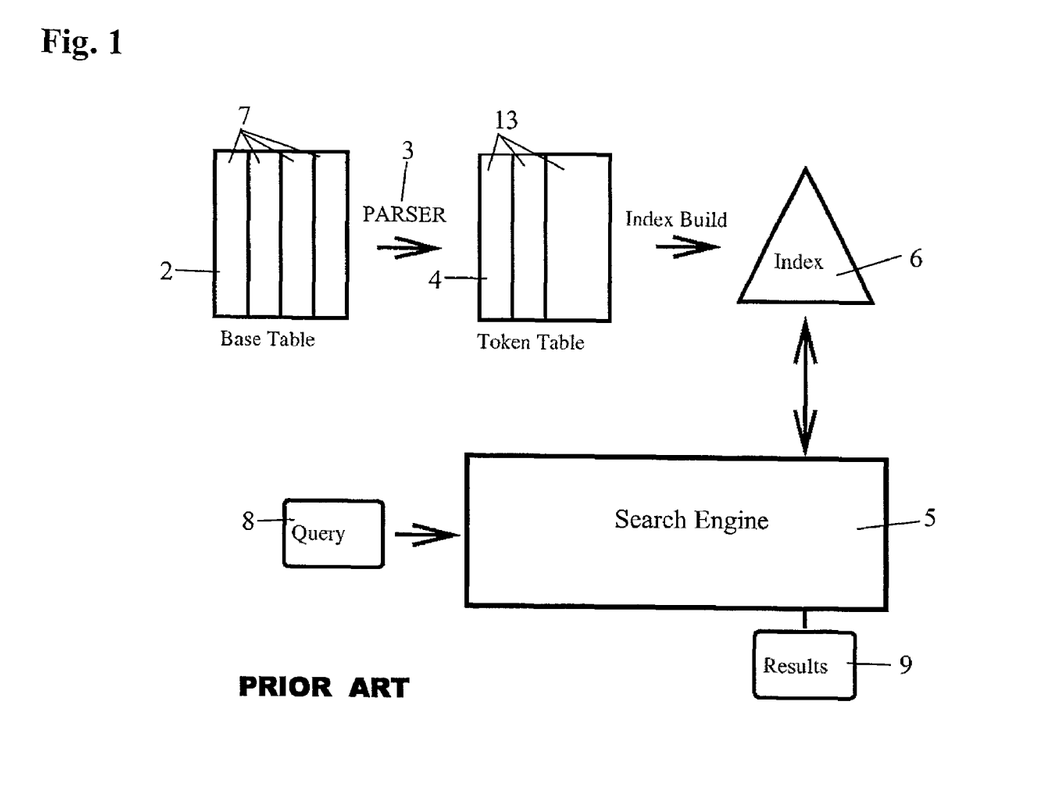
FIG. 1 depicts a prior art embodiment of a search engine.

Referring to FIG. 1, a prior art search engine 5 receives a query 8 and provides results 9. This process calls for use of parser 3, which builds a token table 4 from a base table 2. Typically, the base table 8 is a collection of documents 7. The token table 4 includes tokens 13, which may be considered as segments or compilations of relevant information from a document 7. From the token table 4, an index table 6 is built. Using the input query 8, the prior art search engine 5 typically includes an embedded scoring function to provide scoring and ranking of information in the index table 6.

While this arrangement usually means that runtime optimization performs well, such designs come at the cost of versatility. For example, some text search engines have been customized to the extent of including special purpose hardware to speed up critical operators. This has made sense for certain applications, especially in the case where there are few scoring functions which are of concern. In such instances, there is no need for versatility as understanding the scoring function allows for better scheduling of the runtime operators. However, such engines are typically not very useful in contexts other than those for which they were developed.

It is important that a generic search engine provide a generic interface to support the varied search functions. In particular, the scoring function used to rank results should be "plug and play." That is, what is needed is a runtime search engine for text search and ranking where the scoring function is queried as a "black box."

SUMMARY OF THE INVENTION

The foregoing and other problems are overcome by methods and apparatus in accordance with embodiments of this invention.

Disclosed herein is a computer program product embodied on a computer readable medium, the computer program product providing computer instructions that implement a text and semi-structured search algorithm having a function having an input for receiving, while there is at least one candidate location in an order of locations, a score range for the candidate location, the algorithm comparing the score range to a threshold within a range of possible scores, wherein if a lower bound of the score range for the candidate location exceeds the threshold then the candidate location is retained as a result and a next location is selected, and wherein if an upper bound of the score range is at or below the threshold the candidate location is discarded and the next location is selected, and wherein if the score of the candidate location is indeterminate, then the score range for the candidate location is refined.

Also disclosed is a system for implementing a text and semi-structured search algorithm, that includes a processor for operating an algorithm that has an input for receiving from a blackbox scoring function a score for at least one candidate location in an order of locations, wherein the algorithm compares the score to a threshold, and if the score exceeds the threshold then the candidate location is stored as a result and a next location is selected, and if the score is at or below the threshold the candidate location is discarded and the next location is selected, and wherein if the score of the candidate location is indeterminate, then the score for the candidate location is refined; wherein each result is stored in a table of results ordered by relevance.

Further disclosed is a method for implementing a search of locations in a body of text and semi-structured data for relevant terms, which includes: providing an index of locations formed of terms, wherein a score for the relevant terms in a candidate location is provided by a scoring function and associated with the candidate location; and, while there are candidate locations: refining the score range if the score of the candidate location is indeterminate, otherwise, storing each candidate location as a result if a lower bound of the score range for the candidate location exceeds a threshold within a range of possible scores, discarding the candidate location if the score range is at or below an upper bound for the score range and selecting a next location.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Disclosed herein is a generic search engine that provides a generic interface to support a variety of search functions. In particular, scoring functions 12 used to rank results are queried as a "black box," where an evaluation engine does not require information regarding aspects of the scoring functions 12. An example is depicted in FIG. 2.

Figure 2:
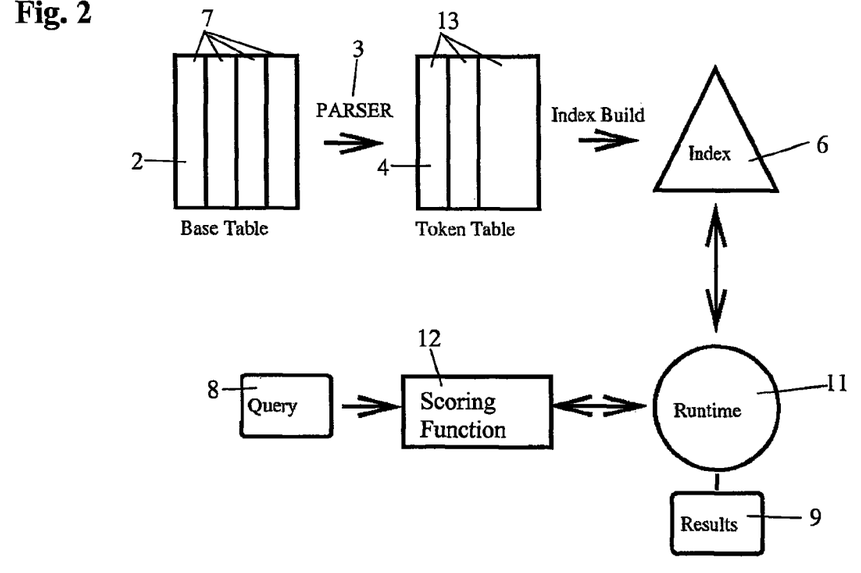
FIG. 2 depicts a search engine in accordance with the teachings herein.

Referring to FIG. 2, searching is completed by use of a runtime engine 11 that receives an input query 8. Using the input query 8, the runtime engine 11 employs an algorithm, disclosed herein in non-limiting embodiments as "Algorithm A," or as "A", to generate results 9. Algorithm A provides an interface to any one or more of various preselected scoring functions 12 to obtain scoring and ranking information used to provide the results 9. Non-limiting examples of scoring functions 12 useful for practice of the teachings herein include: TFIDF, OKAPI, Static Rank, Lexical Affinities, Salience Levels, in addition to Boolean functions and threshold predicates. As one may surmise, the techniques disclosed herein generally provide for scoring and ranking at the level where indexing occurs.

Blackbox Scoring. A first device, the parser 3, produces data for interpretation by the scoring function 12. Thus, parsing and scoring are intimately related. Therefore, a blackbox model for scoring, as depicted in FIG. 1, specifies a corresponding model for parsing and tokenization. In the context of a database, the flow may be triggered by a statement, such as call in the form of the SQL statement below:

CREATE TEXT INDEX <indexname>
ON TABLE <tablename>
USING <parsername1> FOR <column1>
USING <parsername2> FOR <column2>
RANKED BY SCORE <scoringfunction>

First Steps: As an introduction, it is clear that blackbox scoring for a top-1 query can be performed via a table scan of the base table 2. This is shown in Table 1. Note that the algorithm in Table 1 does not address aspects of the functionality of parsers 3 and scoring functions 12, and is therefore only illustrative.

TABLE 1

| | Table Scan (prior art) |
|---|---|
| 1 | Initialize heap |
| 2 | while(docs left) |
| 2.1 | score the next document |
| 2.2 | if it is in top 1, put in heap |
| 3 | return the heap |

Since the score is zero unless the document 7 contains some token in the query 8, only those documents 7 which contain at least one token 13 related to the query 8 need be scored. This provides a basis for speeding the runtime engine 11 by use of the index table 6. Another example is shown in Table 2.

TABLE 2

| | Faster Scan (prior art) |
|---|---|
| 1 | initialize heap |
| 2 | while(docs containing a query token left) |
| 2.1 | score the next such document |
| 2.2 | if it is in top 1, put in heap |
| 3 | return the heap |

Note that the algorithm in Table 2 is not optimal. For example, some scoring functions 12 may evaluate to zero, even when some terms in the query 8 are present. One example is the Boolean AND function. Thus, the filtering provided in step 2 leaves room for improvement.

As disclosed herein, a scoring function 12 which allows input of generic parameters (i.e., "wildcards") can be used as a black box within an efficient and generic runtime 11. Such a scoring function 12 can be used to do a partial evaluation of the score without having to collect all relevant parameters associated with the document 7. This can present significant benefits, as in the case where the relevant parameters are scattered in storage (e.g., over a disk in a text index).

The algorithm disclosed herein is one (non-limiting) embodiment of a generic algorithm "A." One embodiment of Algorithm A is presented in Table 3, below. Algorithm A is described herein in terms of two non-limiting subroutines, nextCand( ) and refine( ). In some embodiments, Algorithm A iterates through documents 7 using the function nextCand( ). Algorithm A uses partial score evaluations to avoid retrieving document parameter values from storage. As used herein, the terms "lower" and "upper" represent the lower bounds and the upper bounds on a range of possible scores for "candidate." As Algorithm A proceeds, Algorithm A takes one of three options. For example, if the current candidate is in the top 1 found so far (see step 2.2), Algorithm A adds it to the heap and continues to the next candidate. If the candidate is not in the top 1 (step 2.3) Algorithm A goes on to the next candidate. If the status of candidate cannot be determined (step 2.4), then Algorithm A tries to refine( ) the score. As a side effect both refine( ) and candidate change the values of lower and upper.

TABLE 3

Algorithm A

| | |
|---|---|
| 1 | initialize heap and set candidate = 0 |
| 2 | while(candidate exists) |
| 2.1 | Let threshold be the smallest score in heap |
| 2.2 | If(threshold < lower) add candidate to the heap candidate = nextCand( ) |
| 2.3 | else if(threshold >= upper) candidate = nextCand( ). |
| 2.4 | Else refine( ) |
| 3 | return the heap |

Note that both algorithms in Tables 1 and 2 are specializations of Algorithm A. In the case of the algorithm in Table 1, nextCand( ) returns candidateDoc+1. In the case of the algorithm in Table 2, nextCand( ) returns the next document 7 which contains at least one of the terms in the query 8. In both cases, refine( ) does a full evaluation of the score, preferably by reading all the parameters from disk. Also, note that Algorithm A can be modified to work in "streaming" mode. In this case, there will be no heap and the threshold will be provided by a caller. Refer to Table 4 for a non-limiting example of the Algorithm A modified to work in streaming mode. Note that in the Algorithm A provided in Table 4, the threshold can be increased in each call to next( ).

TABLE 4

Algorithm A
modified for streaming mode

| | |
|---|---|
| 1 | init( ) { set candidate = 0 } next(threshold) { candidate = nextCand( ) while (candidate exists) { if(threshold < lower) return candidate else if (threshold >= upper) candidate = nextCand( ) |

TABLE 4-continued

Algorithm A
modified for streaming mode

```
        else
            refine( )
    }
    return end of results
}
```

Efficient design of nextCand( ) and refine( ) is important to providing desired performance in the operation of Algorithm A. To this end, some additional introduction is provided regarding parsing, scoring functions 12, text indexes 6, and how text indexes 6 incur I/O penalties. Subsequently, aspects of implementing both nextCand( ) and refine( ) for a blackbox scoring function 21 that supports wildcarding is provided.

The Parser 3. A parser 3 effects the transformation from the base table 2 to the token table 4 shown in FIG. 2 and detailed in Tables 5 and 6. The token t4 need not be stored, but can be streamed directly into the index build phase. The token table 4 represents a ternary relation, (d, t, $\theta_{t,d}$). Here, d is the "document" 7 or the row identifier (RID) where the token t was found. The symbol $\theta_{t,d}$ represents information about token t within document d needed by the scoring function 12 in determining the score of the document 7. This could, for instance, include information about the salience of the token 13, its location(s) within the document 7, the number of times the token 13 occurred in the document 7, as well as other information. The generic search system considers $\theta_{t,d}$ opaque binary data and does not attempt to interpret it. However, it is responsible for storing and retrieving $\theta_{t,d}$ to and from the index table 6.

TABLE 5

| d | Subject | Student | Grade |
|---|---|---|---|
| 1 | English | Adam Smith | B |
| 2 | Math | John Grisham | C |
| 3 | Math | John English | A |
| 4 | English | Johnny Davis | A |

TABLE 6

| d | t | $\theta_{t,d}$ |
|---|---|---|
| 1 | English | Subject |
| 1 | Adam | Student |
| 1 | Smith | Student, Bold |
| 2 | Math | Subject |
| 2 | John | Student, Emphasis |
| 2 | Grisham | Student |
| ... | ... | ... |

In this example, Table 5 represents the base table 2 having two indexable columns, "Subject" and "Student." Table 6 provides a first few rows of the token table 4 corresponding to the base table 2.

Assume, without loss of generality, that the pair (t, d) is a unique key for the token table 4 (otherwise, concatenate the set of associated $\theta$ values). Thus, the reference to $\theta_{t,d}$ is unambiguous. Consider that $\theta_{t,d}$ is null if the token table 4 contains no entry corresponding to the pair (t, d). Otherwise, assume that document d contains t. Thus, per the example in Table 6, $\theta_{John,1}$ is null and the document d contains "Grisham" and "Math."

Preferably, a user can create and register new parsers 3 for any column or data type in concert with creating and registering new scoring functions 12.

Scoring Functions 12. Consider scoring functions 12 having generic input capability (i.e., "wildcard" capability). In the following discussion, differences between SCORE, the intended scoring function 12 (e.g., TFIDF and OKAPI) and score, an implementation of SCORE which supports wildcarding are discussed. Specifically, associated with each query q involving tokens $t_1, t_2, \ldots t_k$, is a blackbox scoring function score($x_1, x_2, \ldots x_k$). If partial evaluation is performed by setting some of the $x_i$ to $\theta_{ti,d}$ and others to "huh" (a wildcard value), score returns a range (lower, upper) giving lower and upper bounds on the document score SCORE(d). Preferably, the score function exhibits the properties set forth in Table 7.

TABLE 7 score Function Properties

1  Monotonicity: lower does not decrease and upper does not increase if a huh parameter is changed to any definite null or non-null θ value.
2  If no parameter is set to huh, upper = lower = SCORE (d)
3  lower ≦ upper Note that any correctly implemented score function does not impose restrictions on the scoring metric SCORE. Most, if not all, commonly used scoring functions 12 admit wildcard capable implementations that satisfy the properties in Table 7.

Text Indexes 6 and Skip Sequential Iterators. A Skip Sequential Iterator (SSI) is a convenient interface to a text index 6. The iterator It corresponds to a token t (i.e., term) and iterates over all documents d containing t. Table 8 contains a definition for one embodiment of an SSI.

TABLE 8

Skip Sequential Iterator (SSI) - Definition
The iterator $I_t$ is associated with a state s, initially 0. Unless s is 0 or ∞, s is a document id containing t. In addition, the iterator $I_t$ has the following interface:

1  loc( ) returns the current state s.
2  data( ) returns $\theta_{t,s}$.
3  next (a) sets s the smallest b >= such that b contains t. If there is no such document id, it sets s to ∞.

The Algorithm A maintains a collection of SSIs, $\{I_t\}$, one per token t in the query. Initially, each iterator $I_t$ is at 0. The Algorithm A moves the iterators $I_t$ by making calls to $I_t$.next (candidate). This call is denoted herein as: toss(t).

Note that a side-effect of the toss(t) operation is that the data value, θhd t,candidate is known. If after a toss(t) call $I_t$.loc( )=candidate, $\theta_{t,candidate}$ is known to be $I_t$.data( ). Otherwise, $\theta_{t,candidate}$=null. Algorithm A uses toss(t) calls to read parameter values in the refine( ) subroutine.

The following assertion follows from the discussion regarding the steps taken by algorithm A.

Lemma: As long as candidate only increases, and the iterators $I_t$ are only moved using toss(t) operations, $\theta_{t,d}$ is null whenever candidate≦d<$I_t$.loc( ).

Defining Subroutines. Aspects of the subroutines nextCand( ) and refine( ) are now defined.

The nextCand( ) function. For convenience, changes are made in the notation used, where the tokens 13 are renamed so that $I_{t1}$.loc( )≦$I_{t2}$.loc( )≦ . . . $I_{tk}$.loc( ). Consider S(d) to be defined as:

$$S(d) = \text{score}\begin{pmatrix} huh, huh, \ldots, \theta_{ti,d}, \\ \theta_{ti+1,d}, \ldots, \text{null, null} \end{pmatrix}.\text{upper} \quad \text{(Eq. 1)}$$

where $t_i, t_{i+1}, \ldots$ are the tokens t, whose iterators $I_t$ are at $I_t$.loc( )= d. For these tokens 13, $\theta_{t,d}$ is available to use without I/O, since $\theta_{t,d}$=$I_t$.data( ). Terms t, whose iterators $I_t$ are at $I_t$.loc( )< d, are parameterized by huh, and those whose iterators $I_t$ are at $I_t$.loc( )>d are parameterized by null.

Figure 3:
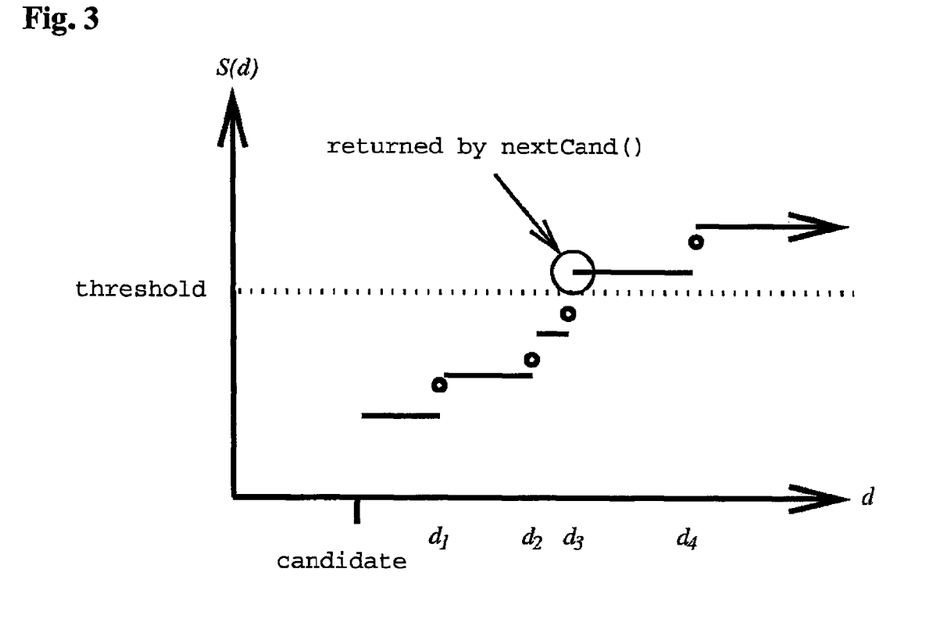
FIG. 3 depicts progress of a query through a series of documents $d_x$.

As shown in FIG. 3, nextCand( ) returns the smallest d>candidate such that S(d)>threshold. As d increases from left to right, the $x_i$ in Eq. 1 changes from null to a definite θ (at d=$I_t$.loc( )( )), to huh at d=$I_t$.loc( )( )+1. Therefore, it is considered that nextCand( ) can be implemented via a linear search using at most 2 k blackbox invocations of score. The computation of nextCand( ) typically does not involve I/O, as all the parameter values required for computing S(d) are available. Referring to FIG. 3, the nextCand( ) function returns the smallest document id d such that S(d) exceeds threshold. In this case, this is $d_3$+1.

The Lemma implies that S(d) is an upper bound on SCORE (d). This is because all definite parameters (not huh) used in the evaluation of S(d) are in fact the correct parameters for document d (either $\theta_{t,d}$ or null). Therefore, all documents 7 skipped by nextCand( ) are not qualified to enter the heap. Finally, since candidate is only updated using a nextCand( ) call, the score for candidate does not decrease. Therefore, a corollary to the Lemma is proffered.

Corollary. As long as refine( ) is implemented using only toss(t) operations, Algorithm A will produce correct results 9.

The refine( ) function. Notice that a toss(t) operation simultaneously reads several θ values. Letting s be $I_t$.loc( ) after the toss(t) operation, $\theta_{t,d}$ is known for any d∈ [candidate,s]. In this case, all but $\theta^{t,s}$ are null. Therefore, refine( ) should operate to choose a term t to toss such that the status of candidate and as many succeeding document ids as possible are resolved by the toss. Clearly, refine( ) can only toss terms whose current locations are smaller than candidate. For all other terms t, $\theta_{t,candidate}$ is identified by refine( ). One can measure (or "learn") the effectiveness of t dynamically by noting exactly how far candidate advanced following a toss(t) operation and attributing this progress to t. The amount attributed to t can be 0 if the status of candidate was not resolved, or a larger number if candidate was advanced by a lot. To this end, Equation 2 provides:

$$\Gamma_t = \frac{\text{total progress attributed to } t}{\text{number of toss}(t) \text{ operations}} \quad \text{Eq. (2)}$$

Assuming that the values $\Gamma_t$ have converged, the token t with the largest value of $\Gamma_t$ is chosen for the toss. Tossing any token 13 such that $I_t$.loc( )≧candidate would be meaningless since the ordering invariant implies that the value of $\theta_{t,candidate}$ is known. Thus, the token 13 with the largest value of $\Gamma_t$ among those for which $I_t$.loc( )<candidate is tossed. $\Gamma_t$ may be evaluated using other techniques such as geometric mean, moving averages, logarithmic scaling and others. In some embodiments, $\Gamma_t$ is provided as an input having a known value.

Experimental Evidence Supporting Algorithm A. This section provides experimental evidence affirming the utility of algorithm A. Consider that Algorithm A trades processing speed (CPU cost) for the benefit of the versatility offered.

Therefore, criteria for evaluating the utility of Algorithm A evaluates whether the trade is warranted. In order to address this evaluation, three tests are proffered, with a subsequent evaluation of performance.

First, the additional computational cost (i.e. CPU cost) of dealing with blackbox scoring functions is considered. Secondly, the fraction of the total cost of query processing that the CPU cost represents is evaluated. Third of all, functions which are difficult to optimize are considered.

In short, it has been determined that CPU cost is moderate. In tests performed, the CPU cost was never worse than a factor of two, even when the scoring functions 12 were simplistic (i.e., Boolean AND and Boolean OR functions). These were considered to be the worst case, since the optimized non blackbox code was shown to perform well in these cases. It was found that the fraction of the total cost of query processing depends on the cost of input and output (I/O). Testing showed that CPU cost was a negligible fraction of the runtime, as the cost of the I/O operations increased. For instance, if the cost of a toss( ) was at least 0.001 millisecond, (which is considered to be an aggressive estimate by any standard), then the additional cost of the learning computation and using the blackbox was shown to be less than 3%. Since A does not depend on knowing the SCORE function, this overhead is likely to be small even for complicated SCORE functions. Last of all, considering functions where optimization presents challenges, it was found that for a simple four node, two level, tree of un-weighted threshold gates, much like what is commonly used in text processing, Algorithm A performs significantly better in terms of both CPU cost and I/O than the natural extension of a Zig-Zag search or a Merge search. Notice that Zig-Zag and Merge are "locally optimal" for each of the nodes in the tree, and do not share the global perspective on optimization of Algorithm A.

Performance testing was undertaken by implementing Algorithm A on two platforms. The first (P1) provided an artificial test platform for testing the algorithm function. The second (P2) used a full text index with blackbox scoring functions 12, such as TFIDF, OKAPI, Static Rank, Lexical Affinities, in addition to Boolean functions and threshold predicates.

An index containing 8 GB of index data and over IM documents was built on the platform. Both algorithms were run on a personal computer (PC) in a Linux environment, with a 2 GHz CPU. The experiments were performed with a cold I/O subsystem. In the P1 system, the tokens 13 included integers and document d contained all tokens 13 which exactly divided d. Thus, the document "10" contains the words "1," "2," "5," "10." Document "11" contains the words "1," "11." The query "3" and "5" should return all multiples of "15." The reason that this platform was considered useful was that no I/O is required in implementing the SSIs. The documents d containing a token t are all multiples of t, and so the next( ) function could be implemented "on the fly." This provided for separating the CPU cost of running A from the cost of the I/O and thus the separate measurement of each. Experiments in this section were implemented on platform P1.

Figure 4:
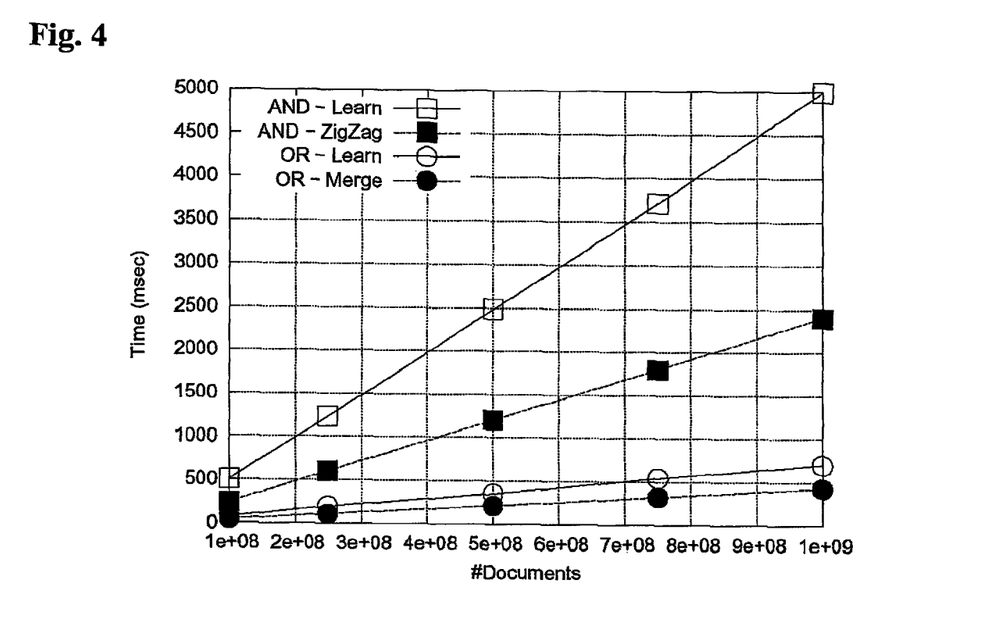
FIG. 4 depicts the processing expense for running a blackbox learning algorithm.

Aspects of CPU cost are depicted in FIG. 4. FIG. 4 shows that the CPU cost (but for a tiny startup cost) of all algorithms is linear in the number of documents processed. This figure establishes that the total CPU cost of running a blackbox learning algorithm is rather small, less than half a second on a base table 2 containing 100 M documents.

FIG. 4 shows that the CPU cost of query processing algorithms scales linearly with the number of documents to be processed. The figure depicts results for four scoring functions 12, and the CPU cost in msec on a 2 GHz CPU. The X-axis depicts the number of documents 7. The curves depicted represent Algorithm A running Boolean AND and Boolean OR (labeled as and -learn and as or -learn) as well as the optimal Zig-Zag and Merge algorithms for AND and OR respectively. As can be seen, even with 109 (1 Billion) documents, the total CPU time taken in the worst case is rather small, about 5 seconds.

Figure 5:
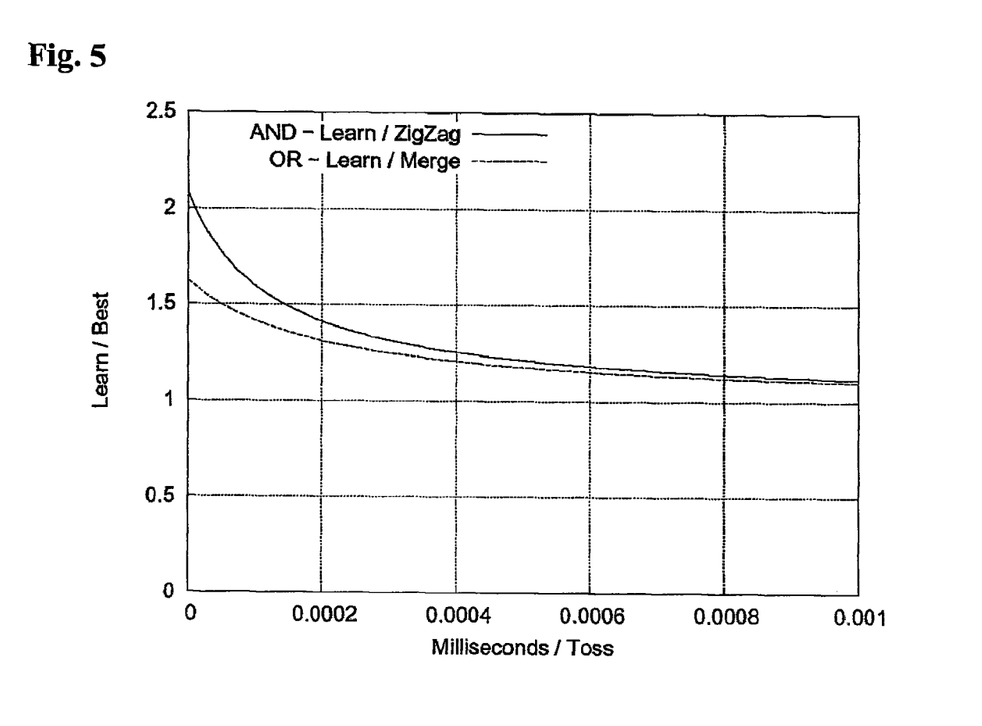
FIG. 5 depicts the processing expense as a fraction of total processing requirements.

FIG. 5 depicts aspects of CPU cost as a fraction of total cost. As discussed above, blackbox function evaluations and all the learning needed in picking the correct parameterization for blackbox score functions takes very little CPU usage. FIG. 5 provides an assessment of how this number compares with the total cost of running the query 8.

In FIG. 5, the overhead CPU cost of the learning Algorithm A is negligible. The figure shows two curves, corresponding to the Boolean AND and the Boolean OR function respectively. The number shows the ratio of clock time taken as a function of I/O cost. The I/O cost was modeled by implementing a spin loop to model a disk access. The X-axis shows the time expended in the spin loop per I/O operation. As can be seen, if the I/O operation were to cost 0.001 millisecond, Algorithm A is 3% worse than the optimal Zig-Zag on AND queries and only 1% worse than Merge on OR queries. Recall that Algorithm A does not know the difference between AND and OR, but self tunes to the correct execution strategy in both cases.

Figure 6:
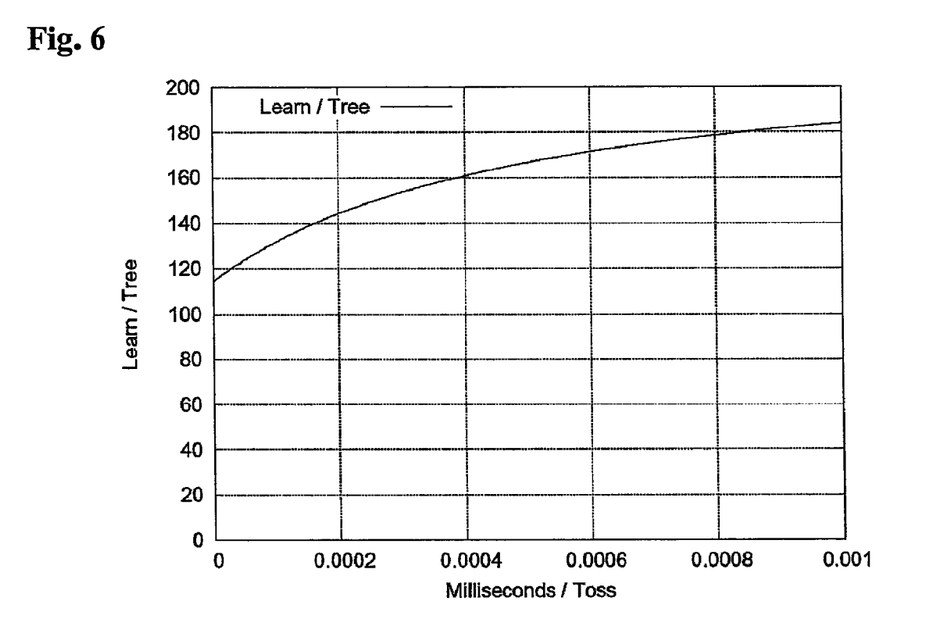
FIG. 6 depicts performance of the Algorithm A for a complex query.

In FIG. 6, performance for a complex query is depicted. On a two level threshold tree with four gates using a set of strongly correlated and strongly anticorrelated terms (a typical optimization nightmare), Algorithm A performed about 100 times better on both CPU and I/O measures when compared to an algorithm which choose the optimum join method for each node in the tree. Thus, the "global" perspective that Algorithm A takes on optimization results in far more efficient runtime performance.

About Algorithm A: Generalizing Zig-Zag and Merge. If the SCORE function is a k-way Boolean AND, the optimal runtime strategy is the Zig-Zag join algorithm. In the case of Boolean SCORE functions, the θ values are not relevant. Thus, the interest is only in whether a term t is contained in document d. In the case of Boolean AND, is easy to see that candidate should be the maximum $I_t$.loc( ) value. Also, the token tin toss(t)is chosen to be the rarest token whose location is not candidate. Hardcoding these choices results in the Zig-Zag join algorithm. A will automatically mimic this tuned strategy. That is, since score will return a 0 upper and lower bound if even one parameter is set to null, candidate will always be the maximum $I_t$.loc( ). S(d) will be 0 for all documents 7 having lower scores. Moreover, $\Gamma_t$ will converge to be large for rare tokens 13 and small for common tokens 13. Algorithm A also generalizes the merge operator for Boolean OR queries. Note that Algorithm A will converge to the optimum behavior in both cases while only making blackbox calls to score.

Minterms: As stated above, refine( ) is free to toss any input $I_t$ such that $I_t$.loc( )<candidate. However, tossing some input $I_t$ is fruitless when knowledge of $\theta_{t,candidate}$ will not affect the decision to keep or discard the candidate. For example, consider the Boolean query (A & B)|(C & D). When $I_C$.loc( )< $I_A$.loc( )<$I_B$.loc( )<$I_D$.loc( ), then candidate=$I_B$.loc( ). Knowledge of whether C contains candidate is irrelevant; the next location where we are interested in C is at $I_D$.loc( ). Therefore, C should not be tossed until candidate=$I_D$.loc( ). We say that an input $I_t$ is part of a minterm in the current state when its $\theta_{t,candidate}$ can affect the decision to keep or discard the candidate when combined with other inputs.

An input that is part of a minterm can be found efficiently using monotonicity of the score upper bound when a parameter is changed from huh to null: Order the inputs with $I_r.loc( )<$ candidate arbitrarily. Recall that these inputs pass huh parameters to the score function. We will use the known $\theta_{t,candidate}$ (null or non-null) for inputs with $I_r.loc( )\geq$candidate. Notice that with all these $\theta_{t,candidate}$ and huh values, lower≦threshold≦upper because we are in refine( ). We can find the first input from our ordering that is part of some minterm in the following way: one-by-one change a huh to null and reevaluate the score bounds. By monotonicity, upper will decrease or remain constant and lower will increase or remain constant. The first input to make upper≦threshold or threshold<lower is part of some minterm. Such an input will be always be found because if the last huh value is changed to null, then lower=upper and one of the two conditions must be met.

The minterm algorithm works with any ordering, but some orderings are better than others. In particular, we can order the inputs based upon our preference to toss them, based upon sparsity (given or learned), cost to toss, or some combination. In doing so, we toss the most preferred input from some minterm. Note that that a more preferred input may be part of another minterm. However, every minterm will need to be handled before we can advance the candidate, unless we conclude that the candidate is in the result. For sparsity-ordered inputs, we choose the sparsest input from the densest minterm; this gives us the best chance to prove the candidate is in the result and advance the candidate. To minimize cost, the algorithm can be easily extended to find the least cost input that is part of some minterm (order by decreasing cost and find the complete minterm by restoring the last value to huh and continuing to set huh to null looking for each input that causes a bound to cross the threshold).

Hard-Coding nextCand( ): In some cases, it is possible to compute nextCand( ) for all possible $\theta_t$,4huh values. This computation further reduces repeatedly calling score.

Aggressive Heap Initialization. The efficiency of Algorithm A can be increased by using Aggressive Heap Initialization. In embodiments involving this optimization, dummy entries with high (but not too high) scores are inserted in the heap during initialization. This inflates the value of threshold, and consequently, fewer candidate values get examined. In order to illustrate this, refer FIG. 3, and consider what will happen if the threshold value is increased. The danger incurred in using optimization is that fewer than l documents may be returned. Depending on the query 8, such initialization can (but does not always) result in a performance enhancement. In this regard, consider FIG. 7.

Figure 7:
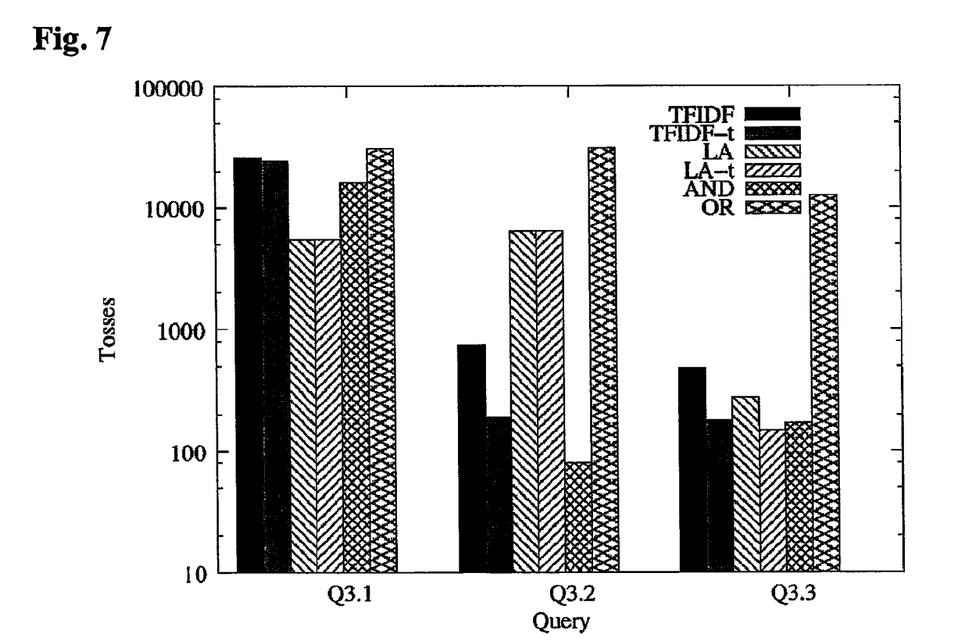
FIG. 7 depicts aspects of performance as a result of adjusting the threshold.

FIG. 7 shows that Algorithm A benefits by aggressive threshold setting, as is expected. The figure shows four standard scoring functions 12, TFIDF, Lexical Affinities (LA), and the aggressively thresholded versions of TFIDF-t and LA-t. The bars chart the performance in terms of the number of toss( ) operations of Top-10 queries on run on a single platform. The threshold for TFIDF-t and LA-t was set to be the best possible, (i.e. the tenth highest score with the conjunctive and disjunctive Boolean queries in the last two columns to provide a baseline to interpret the main results). In queries Q3.2 and Q3.3, aggressive heap initialization helped. In query Q3.2, it helped TFIDF by a factor of 4. In query Q3.3, it helped both TFIDF and LA by a factor of 2.7 and 1.9 respectively. The queries used were proper name search queries of increasing complexity (i.e., they expanded initials, and looked for alternate forms ("Bob" OR "Robert")).

Static Scores. Many search engines have a static component to the SCORE function. One example involves use of PageRank, which measures the desirability of a page independent of the query q. Algorithm A can be used to account for static scores as well. In one embodiment, a virtual token 13 is added (e.g., : static :) to each document 7 and set $\theta_{:static:,d}$ to be the static score (predetermined score) for d. In another embodiment, the static score is included in every $\theta_{t,d}$. When the documents are ordered by decreasing static score in the index (i.e., the documents are considered by Algorithm A in decreasing static score), then the partial score function can use the static score of any document≦candidate as an upper bound for all locations≧ candidate. Typically, this results in a decrease in the upper bounds of future documents. In particular, the upper bound when nothing is known about a document (i.e., score (huh, huh, . . . , huh) given the upper bound of static) generally decreases; when the upper bound of score with all huh values is below threshold, Algorithm A terminates early without considering any of the remaining documents.

Figure 8:
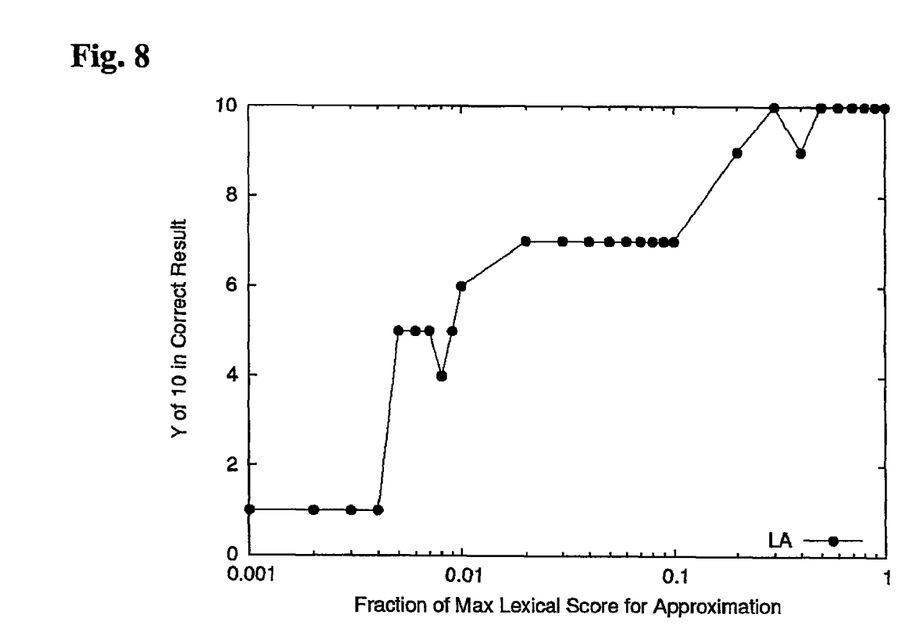
FIGS. 8-9 depict performance as a result of "unsafe" approximations.
Figure 9:
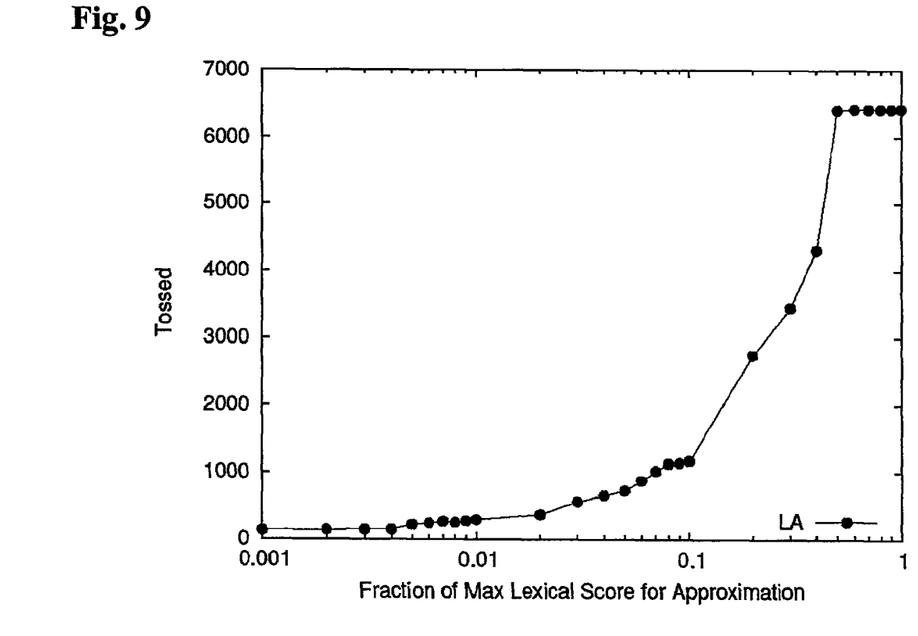

Unsafe Approximations in upper. Algorithm A permits under-estimates when computing upper, which trades recall for performance. Typically, the closer the under-estimate, the better the recall. If upper is always an over-estimate, then A will find the exact result. Typically, the closer the over-estimate, the better the performance. Testing in this instance involved use of the Lexical Affinity SCORE function, which scores documents 7 based on the reciprocal of the distance between the query terms. The closer the terms are located within the document 7, the higher the score. A conservative value of upper was derived assuming that each wildcard query term occurs at a distance of one from every other query term. FIGS. 8-9 depict the effect of relaxing this assumption. The X-axis is the reciprocal of the assumed distance between query terms. Unsafe approximations can offer large gains in performance, without necessarily sacrificing significant quality of the results 9.

Referring to FIGS. 8-9, the two figures show the loss in recall and the gain in performance respectively when the implementation of score does increasingly unsafe approximations of the LA (Lexical Affinity) function by assuming that the default reciprocal distance is the X axis.

Incremental Evaluation: Algorithm A treats evaluations of SCORE as cheap and consequently may use a number of evaluations. However, if SCORE is relatively expensive to evaluate, A may run into a computational (rather than an I/O) bottleneck. Preferably, incremental evaluation is used to at least partially address potential computational problems. In the Boolean context, this concern can be addressed by hard coding the evaluation of nextCand( ) and refine( ). When dealing with scoring functions, both nextCand( ) and refine( ) are not simply functions of the location order of the simple predicates, but depend in a non-trivial manner on the data associated with iterator locations. Accordingly, an object interface to scoring functions may be used, rather than a functional one. In this embodiment, the scoring object will maintain the state of each of the k input parameters as well as the current candidate location, loc. One example of interface methods to manipulate the state is provided as follows:

1. set(i,x, $\theta$) sets the state of parameter i∈[k] to (x, $\theta$).
2. setLoc(loc) sets the candidate location to loc.
3. getscore( ) returns the score.

Incremental evaluation of SCORE can result in a more streamlined runtime at the cost of some additional programming work. Recalculating the SCORE dynamically when a variable is updated can be significantly cheaper than de novo evaluations of the score.

Figure 10:
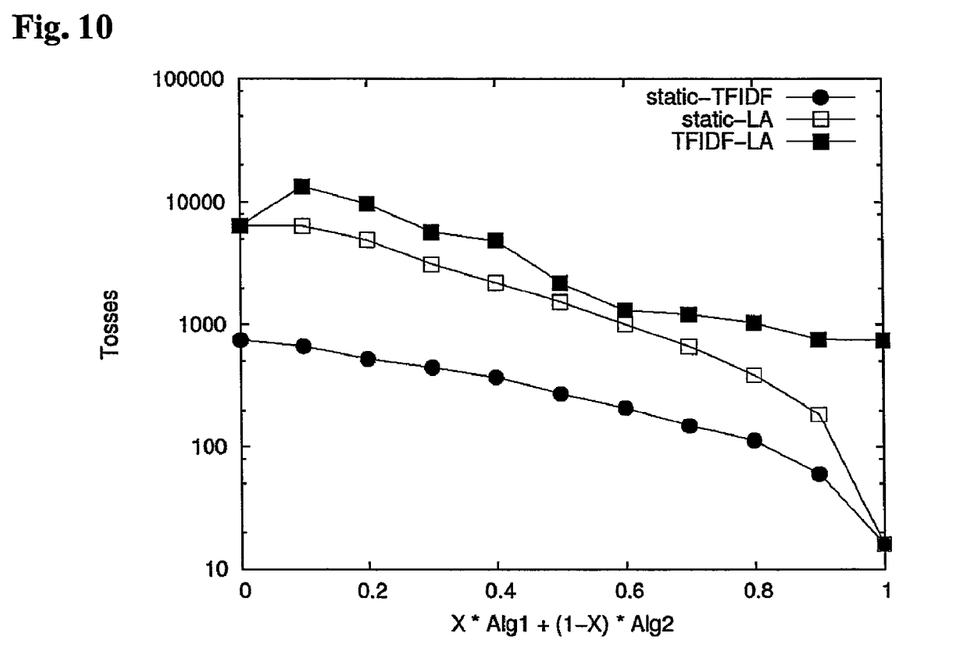
FIG. 10 depicts performance where scoring functions are combined.

Combining Scores and Aggregation. Combining SCORE functions may be performed. For example, if the desired scoring metric is SCORE(d)=$\lambda_1$SCORE$_1$(d)+$\lambda_2$SCORE$_2$(d), then the implementations of score can be combined using the same ratio. Thus, upper=$\lambda_1$upper$_1$+$\lambda_2$upper$_2$ and likewise lower. Arguably, the most important combined score mixes a document's static score (e.g., PageRank) with a dynamic score (e.g., TFIDF or LA). FIG. 10 shows that Algorithm A behaves sublinearly when it combines scores. This is preferred over when the two score functions are computed independently and then added together.

As one may surmise, refining the score range for the candidate location may involve any one, or a combination of, techniques for advancing the input iterator $I_t$. For example, in one embodiment, the input iterator $I_t$ that is set to a location before the candidate location is advanced to the candidate location and the score range is reevaluated. In another embodiment, the input iterator $I_t$ is randomly selected for advancement. In another embodiment, input iterators $I_t$ are advanced in a round-robin fashion. In another embodiment, the input iterator that is the least expensive is advanced. In one embodiment, the sparsest input iterator $I_t$ is advanced. One example of this embodiment calls for identifying the sparsest input iterator by measuring the effectiveness of the input iterator $I_t$ to advance the candidate location. In this case, one measure includes measuring the effectiveness by dividing total progress attributed to the input iterator $I_t$ by a number of toss operations for the input iterator $I_t$.

In a further embodiment, refining the score range for the candidate location involves advancing a first iterator in an order of iterators set before the candidate location which is chosen such that when all iterators set after the chosen iterator are assumed to occur at the candidate location, all iterators before the chosen iterator are assumed to not occur at the candidate location, the upper bound is above the threshold when the chosen iterator is assumed to occur at the candidate location, and the upper bound is below the threshold when the chosen iterator is assumed to not occur at the candidate location.

Consider again the choice of index based document at a time (DAAT) strategies versus term at a time vector based (TAAT) strategies for implementing a query. The modern opinion is that for large data sets, the index based runtimes outperform the vector based runtimes. However, index based runtimes are hard to implement and each ranking engine is built as a specially engineered, custom system.

To address this issue, information retrieval engines are typically built using a two layer architecture. The scoring function 12 is approximated using a Boolean query. The lower stage performs index based retrieval based on the Boolean query (or near Boolean query—Boolean with a "near" operator) which is then passed downstream to the ranking stage for a complete evaluation. This strategy is a more efficient version of algorithm 1.2. The filtering predicate is more selective than a simple Boolean "OR."

From a runtime optimization perspective, this architecture has two potential problems. First, there is the need for a layer for approximating query into Boolean form. This can be a complicated or even an impossible process for black box scoring functions. The only viable option may be using a mostly ineffective filter like the Boolean "OR" used in algorithm of Table 2. Second, even if effective approximations were possible, the resulting Boolean filter can be complicated and lead to daunting runtime optimization problems. As an example, a TFIDF like threshold Boolean query requiring any 3 of 5 given terms has a Boolean DNF form involving:

$$\binom{5}{3} = 10 \text{ distinct disjuncts, each of size 3.}$$

From a functional perspective, scoring functions 12 use more information than Boolean filters do. For instance, TFIDF requires an input of the frequency of a term within a document 7, which is more intensive than whether a term is present in the document 7. This information, available but not used in Boolean processing, represents a significant lost opportunity for runtime optimization. This opportunity is usually reclaimed by more special purpose code and compensation within the filtering phase.

The database point of view. The database equivalent of the Information retrieval TAAT/DAAT question is the choice between bulk join methods such as Sort/Merge and Hash Join and small footprint, index aided joins such as Index Nested Loop joins. A further challenge is in handling XML documents. The challenge is two fold. First, current database community focus in XML retrieval largely concerns the Boolean domain, and does not consider information retrieval issues such as scoring concerns. Second, the retrievable entity is generally no longer a "document" but is arranged within a hierarchy.

Figure 11:
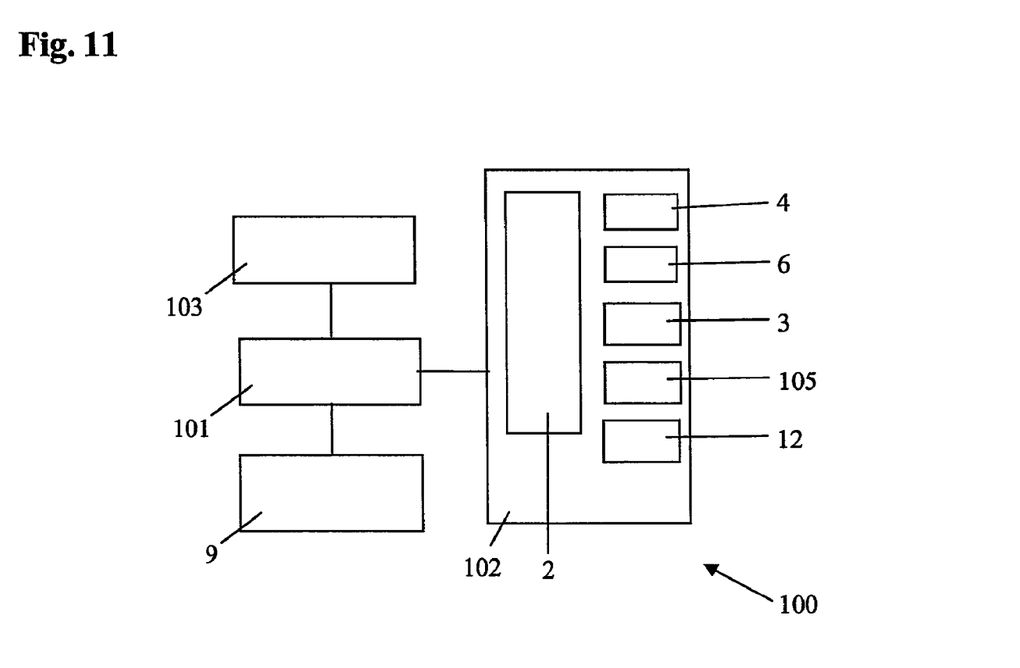
FIG. 11 depicts aspects of components for execution of Algorithm A.

Having described aspects of Algorithm A, one may recognize with reference to FIG. 11 that a system 100 suited for implementation of Algorithm A includes a processor 101, which is coupled to storage 102. Also coupled to the processor is at least one input and output (I/O) device 103, such as a keyboard for inputting a user query 8.

The storage 102 includes a Base Table 2, which is typically managed by a database manager 106. Also stored in storage 20 is the Algorithm A, 105, which draws upon scoring functions 12 as needed. The scoring functions 12 may include those discussed herein, such as Boolean functions or queries, and may include intermediate devices, such as posting lists. Operation of the Algorithm A 105 occurs by the operation of the processor 101, which queries the Base Table 2, to provide results 9. Other components, such as the parser 3, the token table 4 and the index table 6 are typically contained in storage 102.

This invention thus also pertains to a computer program product embodied on a computer readable medium, such as disk, tape and/or semiconductor or other memory. The computer program product includes computer instructions that, when executed by a data processor, such as the processor 101 of FIG. 11, result in the implementation of the Algorithm A, and methods as described above.

One skilled in the art will recognize that the invention disclosed herein is not limited to the embodiments set forth. More specifically, it is considered that the embodiment of Algorithm A, as well as the scoring functions discussed, are only illustrative of the invention herein, and are not limiting as other embodiment may be apparent to one skilled in the art.

What is claimed is:

1. A computer program product embodied on a computer readable medium, the computer program product comprising computer instructions that implement the following operations:

performing the following in response to a query comprising at least two terms, the query having a first portion comprising at least one term of the at least two terms and a second portion comprising at least one other term of the at least two terms:
selecting a document from a plurality of documents;

determining a score range of possible scores for the selected document by using a scoring function,
where the score range comprises a lower bound and an upper bound, where the upper bounds and lower bounds are not equal,
the determining the score range causing the scoring function to perform a partial evaluation, using only the first portion of the query, for the selected document in order to determine the score range,
a score of the selected document residing within the score range and determinable using the first and second portion from the query; and
determining, based at least on the score range, whether the selected document is relevant to the query, and if the selected document is relevant to the query, retaining the selected document as being relevant to the query,
where the selected document is determined as relevant to the query in response to determining that the lower bound of the score range exceeds a threshold and
the selected document is determined as not relevant to the query in response to determining that the upper bound of the score range does not exceeds the threshold.

2. The computer program product of claim 1, wherein determining whether the selected document is relevant to the query further comprises performing, based at least on the score range and the threshold, one of the following:
choosing the selected document as relevant to the query;
selecting another document; or
refining the score range for the selected document.

3. The computer program product of claim 2, wherein determining the score range further comprises sending a second query to the scoring function, the second query comprising a number of first terms equivalent to a number of second terms in the at least two terms of the query, each first term in the second query corresponding to a second term in the first query, wherein determining the score range also further comprises setting at least one of the first terms in the second query to one of a wildcard value or a null value, and wherein refining further comprises refining the score range by setting one or more of the first terms previously set to the one of the wildcard value or the null value to corresponding second terms.

4. The computer program product of claim 2, wherein the threshold is set as a smallest score in a heap having a predetermined number of entries, wherein choosing further comprises placing each selected document chosen as relevant to the query into an entry of the heap, wherein a chosen document replaces a previously placed document if the previously placed document has a score that is smaller than a score for the chosen document.

5. The computer program product of claim 2, wherein the threshold is provided.

6. The computer program product of claim 2, wherein each of the plurality of documents correspond to a document identification, wherein the document identifications are placed in an order, and wherein selecting the other document comprising selected the other document by choosing a document identification in the order such that an upper bound of the score range for the other document exceeds the threshold.

7. The computer program product of claim 2, wherein each of the plurality of documents correspond to a document identification, wherein the document identifications are placed in an order, wherein there are a plurality of iterators, each iterator associated with a single term in the at least two terms of the query, wherein each iterator is able to move through the order of document identifications corresponding to the term associated with the iterator, and wherein refining the score range uses at least one of the iterators.

8. The computer program product of claim 7, wherein each iterator is parameterized by one of a wildcard value, the term corresponding to the iterator, or a null value, and wherein iterators set to a document identification within a first range of document identifications are parameterized by the wildcard value, iterators set to a document identification equal to the document identification for the selected document are parameterized by terms corresponding to the iterators, and iterators set to a document identification within a second range of document identifications are parameterized by the null value.

9. The computer program product of claim 8, wherein refining the score range further comprises sending a second query to the second function in order to receive a second score range for the selected document, the second query defined by at least the parameterization of the iterators.

10. The computer program product of claim 9, wherein refining further comprising selecting one of the iterators, wherein the selected iterator is initially set to a document identification in the first range of document identifications, and wherein refining further comprises moving the selected iterator to the document identification of the selected document.

11. The computer program product of claim 9, wherein refining the score range further comprises moving a randomly selected iterator from a document identification in the first range of document identifications to the document identification of the selected document.

12. The computer program product of claim 9, wherein refining the score range further comprises moving the input iterators in a round robin fashion, each of the iterators moved from a document identification in the first range of document identifications to the document identification of the selected document.

13. The computer program product of claim 9, wherein refining the score range further comprises moving a selected iterator of the plurality of iterators that is the least expensive according to a metric to move of the plurality of iterators, wherein the movement occurs from a document identification in the first range of document identifications to the document identification of the selected document.

14. The computer program product of claim 1, wherein determining whether the selected document is relevant to the query further comprises performing, based at least on the score range and the threshold, one of the following: selecting another document; and refining the score range for the selected document,
wherein in response to selecting another document, determining the score range and determining whether the selected other document is relevant to the query are performed using the selected other document, and in response to refining the score range for the selected other document, determining whether the selected other document is relevant to the query is performed using the selected document and the refined score range.

15. The computer program product of claim 1, wherein determining the score range further comprises sending a second query to the scoring function, the second query comprising a number of first terms equivalent to a number of second terms in the at least two terms of the query, each first term in the second query corresponding to a second term in the first query, wherein determining the score range also further comprises setting at least one of the second terms in the second query to one of a wildcard value or a null value.

16. The computer program product of claim 1, wherein each of the plurality of documents correspond to a document identification, wherein the document identifications are placed in an order, wherein an index is formed using the document identifications and associated terms, each entry in the index is unique and corresponds to a document identification and at least two terms in a document corresponding to the document identification.

17. The computer program product of claim 1, wherein the scoring function comprises a Boolean function.

18. The computer program product of claim 1, wherein the scoring function comprises at least one of a Term Frequency Inverted Document Frequency (TFIDF) function, a Static Rank function, a Searching by Numbers function, a Lexical Affinities (LA) function a Salience Levels (SL) function, and a threshold predicate function.

19. The computer program product of claim 1, wherein a predetermined score is associated with each document and the scoring function uses the predetermined score in order to determine the score range.

20. A system comprising a processor configured to perform operations of:
in response to a query comprising at least two terms, selecting a document from a plurality of documents, the query having a first portion comprising at least one term of the at least two terms and a second portion comprising at least one other term of the at least two terms;
determining a score range of possible scores for the selected document by using a scoring function,
where the score range comprises a lower bound and an upper bound, where the upper bounds and lower bounds are not equal,
the determining the score range causing the scoring function to perform a partial evaluation, using only the first portion of the query, for the selected document in order to determine the score range,
a score of the selected document residing within the score range and the score determinable using the first and second portion from the query, and
determining, based at least on the score range, whether the selected document is relevant to the query, and if the selected document is relevant to the query, retaining the selected document as being relevant to the query,
where the selected document is determined as relevant to the query in response to determining that the lower bound of the score range exceeds a threshold and
the selected document is determined as not relevant to the query in response to determining that the upper bound of the score range does not exceeds the threshold.

21. The system of claim 20, wherein determining whether the selected document is relevant to the query further comprises performing, based at least on the score range and the threshold, one of the following: choosing the selected document as relevant to the query; selecting another document; or refining the score range for the selected document.

22. The system of claim 20, wherein determining whether the selected document is relevant to the query further comprises performing, based at least on the score range and the threshold, one of the following: selecting another document; and refining the score range for the selected document,
wherein in response to selecting another document, determining the score range and determining whether the selected document is relevant to the query are performed using the selected other document, and in response to refining the score range for the selected document, determining whether the selected document is relevant to the query is performed using the selected document and the refined score range.

23. A method comprising:
performing the following in response to a query comprising at least two terms, the query having a first portion comprising at least one term of the at least two terms and a second portion comprising at least one other term of the at least two terms:
selecting a document from a plurality of documents;
determining a score range of possible scores for the selected document by using a scoring function,
where the score range comprises a lower bound and an upper bound, where the upper bounds and lower bounds are not equal,
the determining the score range causing the scoring function to perform a partial evaluation, using only the first portion of the query, for the selected document in order to determine the score range,
a score of the selected document residing within the score range and the score determinable using the first and second portion from the query; and
determining, based at least on the score range, whether the selected document is relevant to the query, and if the selected document is relevant to the query, retaining the selected document as being relevant to the query,
where the selected document is determined as relevant to the query in response to determining that the lower bound of the score range exceeds a threshold and
the selected document is determined as not relevant to the query in response to determining that the upper bound of the score range does not exceeds the threshold.

24. The method of claim 23, wherein determining whether the selected document is relevant to the query further comprises performing, based at least on the score range and the threshold, one of the following: choosing the selected document as relevant to the query; selecting another document; or refining the score range for the selected document.

25. The method of claim 24, wherein in response to selecting another document, determining the score range and determining whether the selected document is relevant to the query are performed using the selected other document, and in response to refining the score range for the selected document, determining whether the selected document is relevant to the query is performed using the selected document and the refined score range.

* * * * *